(12) United States Patent
Maeda

(10) Patent No.: US 11,586,031 B2
(45) Date of Patent: Feb. 21, 2023

(54) IN-LINE STITCHED IMAGE OPTICAL SYSTEM ARCHITECTURE FOR GLV LASER LINE IMAGERS

(71) Applicant: Palo Alto Research Center Incorporated, Palo Alto, CA (US)

(72) Inventor: Patrick Y. Maeda, Mountain View, CA (US)

(73) Assignee: XEROX CORPORATION, Norwalk, CT (US)

( * ) Notice: Subject to any disclaimer, the term of this patent is extended or adjusted under 35 U.S.C. 154(b) by 392 days.

(21) Appl. No.: 16/923,881

(22) Filed: Jul. 8, 2020

(65) Prior Publication Data

US 2022/0011566 A1    Jan. 13, 2022

(51) Int. Cl.
| | |
|---|---|
| G02B 26/08 | (2006.01) |
| H04N 9/31 | (2006.01) |
| G02B 27/18 | (2006.01) |
| B41J 2/465 | (2006.01) |

(52) U.S. Cl.
CPC .......... *G02B 26/0808* (2013.01); *B41J 2/465* (2013.01); *G02B 27/18* (2013.01); *H04N 9/3141* (2013.01)

(58) Field of Classification Search
CPC ............ A61B 17/0401; A61B 17/0482; A61B 17/3421; A61B 2017/00438; A61B 2017/00805; A61B 2017/0409; A61B 2017/0437; A61B 2017/0448; A61B 2017/0459; A61B 2017/3405; A61B 2090/034; A61B 42/20; B41J 2/465; G02B 26/0808; G02B 27/18; G06F 11/22; H04N 9/3141; H04N 9/3147; H04N 9/317

See application file for complete search history.

(56) References Cited

U.S. PATENT DOCUMENTS

| | | | |
|---|---|---|---|
| 6,154,259 A | * | 11/2000 | Hargis ................. H04N 9/3132 353/69 |
| 6,806,897 B2 | | 10/2004 | Kataoka et al. |
| 6,896,822 B2 | | 5/2005 | Amm et al. |
| 7,177,081 B2 | | 2/2007 | Tomita et al. |
| 7,903,337 B1 | | 3/2011 | Hunter et al. |

(Continued)

OTHER PUBLICATIONS

F. Picard, et al., "MEMS-based light valves for ultra-high resolutions projection displays," Defence R&D Canada—Toronto, Technical Report, DRDC Toronto TR 2002-141, Dec. 2002.

(Continued)

*Primary Examiner* — Joseph P Martinez
*Assistant Examiner* — Vipin Patel
(74) *Attorney, Agent, or Firm* — Ortiz & Lopez, PLLC; Luis M. Ortiz; Kermit D. Lopez

(57) ABSTRACT

An optical imager system and method of operating the optical imager system, can include one or more imager modules including a laser light source, a collimator, an illumination optical system, a grating light valve, a spatial light modulator and a projection optical system. A group of imager modules can include the one or more imager modules. The group of imager modules is operable in a stacked arrangement to produce an image from in-line stitching of individual images generated by the one or more imager modules. The illumination optical system can homogenize, shape, and direct a beam from the laser light source onto the grating light valve, and homogenization can occur in a cross-process direction.

20 Claims, 14 Drawing Sheets

(56) References Cited

U.S. PATENT DOCUMENTS

| | | | |
|---|---|---|---|
| 8,508,791 B1 | 8/2013 | Paul et al. | |
| 9,971,147 B2 | 5/2018 | Atwood et al. | |
| 10,466,455 B2 | 11/2019 | Maeda et al. | |
| 10,551,625 B2 | 2/2020 | Maeda et al. | |
| 2002/0164069 A1* | 11/2002 | Nagano | B29C 64/129 |
| | | | 382/154 |
| 2002/0180944 A1* | 12/2002 | Fujii | G03F 7/2053 |
| | | | 355/68 |
| 2013/0050803 A1* | 2/2013 | Stowe | G03F 7/70275 |
| | | | 359/290 |
| 2019/0346683 A1 | 11/2019 | Chua et al. | |
| 2020/0117016 A1 | 4/2020 | Maeda et al. | |

OTHER PUBLICATIONS

D.M. Bloom, Silicon Light Machines (formerly Echelle, Inc.), "The Grating Light Valve: revolutionizing display technology," Proc. SPIE 3013, Projection Displays III, (May 8, 1997).

Wikipedia, "Gaussian beam", Retrieved from "https://en.wikipedia.org/w/index.php?title=Gaussian_beam&oldid=943440740", Mar. 1, 2020.

Wikipedia, "Grating light valve", Retrieved from "https://en.wikipedia.org/w/index.php?title=Grating_light_valve&oldid=933650235", Jan. 2, 2020.

Jahja I. Trisnadi, Clinton B. Carlisle and Robert Monteverde, "Overview and applications of Grating Light ValveTM based optical write engines for high-speed digital imaging", Presented at Photonics West 2004—Micromachining and Microfabrication Symposium, Jan. 26, 2004, San Jose, CA, USA.

\* cited by examiner

IN-LINE STITCHED IMAGE OPTICAL SYSTEM ARCHITECTURE FOR GLV LASER LINE IMAGERS

TECHNICAL FIELD

Embodiments are related to image generating systems, and in particular to optical imaging systems. Embodiments further relate to grating light valve (GLV) devices used in optical imaging systems. Embodiments also relate to the generation of a high-intensity, substantially one-dimensional line image on an imaging or recording surface using a GLV laser line imager with an in-line image stitched optical system.

BACKGROUND

Some optical imaging systems utilize barber poling or staggered imager modules to generate a complete image by combining smaller images that are offset in the process direction. Grating light valves may be utilized in the context of such optical imaging systems to facilitate the generation and rendering of images.

A grating light valve is a type "micro projection" technology, which can operate using a dynamically adjustable diffraction grating. GLV devices compete with other light valve technologies such as digital light processing (DLP) and liquid crystal on silicon (LCoS) for implementation in video projection systems such as, for example, rear-projection televisions. The use of microelectromechanical systems (MEMS) in optical applications, which is known as optical MEMS or micro-opto-electro-mechanical structures (MO-EMS), has enabled the possibility of combining the mechanical, electrical and optical components at a very small scale.

One of the problems with GLV devices is that conventional high power, GLV-based high-resolution laser optical imager modules, are wider than the images they produce. These modules, therefore, cannot be combined or stacked to produce a seamless longer single pixelated line image from in-line stitching of the smaller individual pixelated line images produced by the individual modules.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide an improved optical imager system and method.

It is another aspect of the disclosed embodiments to provide for an optical imager system and method that can produce a single seamless pixelated one-dimensional line image that can extend in a cross-process direction on an imaging surface from in-line stitching of shorter individual images on the same imaging surface.

It is a further aspect of the disclosed embodiments to provide for an optical imager system and method that can create a seamless pixelated line image through in-line combination of smaller pixelated line images from independent modules that use a GLV spatial light modulator.

It is also an aspect of the disclosed embodiments to provide for methods, systems and devices involving the generation of a high-intensity, substantially one-dimensional line image on an imaging surface or a recording surface (e.g., the surface of a drum cylinder) using a GLV laser line imager with an in-line image stitched optical system.

The aforementioned aspects and other objectives and advantages can now be achieved as described herein. In an embodiment, an optical imager system, can include at least one imager module comprising a laser light source, a collimator, an illumination optical system, a grating light valve, a spatial light modulator and a projection optical system; and a plurality of imager modules that includes the at least one imager module, wherein the plurality of imager modules is operable in a stacked arrangement to produce an image from in-line stitching of individual images generated by the at least one imager module among the plurality of imager modules, wherein the illumination optical system homogenizes, shapes, and directs a beam from the laser light source onto the grating light valve, and wherein homogenization occurs in a cross-process direction.

In an embodiment of the optical imager system, the image can be produced from the in-line stitching of the individual images comprises a seamless longer single pixelated line image from the in-line stitching of smaller individual pixelated line images produced by the at least one imager module.

In an embodiment of the optical imager system, in the cross-process direction, the beam can be shaped in a top-hat irradiance profile or a near top-hat irradiance profile.

In an embodiment of the optical imager system, in a process direction, the beam can comprise a Gaussian irradiance profile.

In an embodiment of the optical imager system, at the grating light valve an illumination can be telecentric or near telecentric in a cross-process direction.

In an embodiment of the optical imager system, the at least one imager module can be organized mechanically into a feathered section and an in-line section, wherein the feathered section and the in-line section are sized and arranged in a configuration of at least one upper level and at least one lower level to facilitate stacking of the stacked arrangement in a manner that avoids mechanical interference between imager modules among the plurality of imager modules.

In an embodiment of the optical imager system, the collimator can comprise at least one of a fast-axis collimator lens, or an aspherical collimator lens.

In an embodiment of the optical imager system, the laser light source can comprise at least one of a laser diode array, a fiber laser, a fiber-coupled laser, a diode-pumped solid-state laser, and a diode laser.

In another embodiment, an optical imager system can include at least one processor and a memory, the memory storing instructions to cause the at least one processor to perform: generating a beam of light by a laser light source included as a part of at least one imager module that comprises the laser light source, a collimator, an illumination optical system, a grating light valve, a spatial light modulator and a projection optical system; producing an image from in-line stitching of individual images generated by the at least one imager module among a plurality of imager modules operable in a stacked arrangement to produce the image from the in-line stitching of individual images generated by the at least one imager module; and homogenizing, shaping and directing a beam of light by the illumination optical system from the laser light source onto the grating light valve, wherein the homogenizing occurs in a cross-process direction.

In another embodiment, a method of operating an optical imager system, can involve: generating a beam of light by a laser light source included as a part of at least one imager module that comprises the laser light source, a collimator, an illumination optical system, a grating light valve, a spatial light modulator and a projection optical system; producing an image from in-line stitching of individual images generated by the at least one imager module among a plurality of imager modules operable in a stacked arrangement to produce the image from the in-line stitching of individual images generated by the at least one imager module; and homogenizing, shaping and directing a beam of light by the illumination optical system from the laser light source onto the grating light valve, wherein the homogenizing occurs in a cross-process direction.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
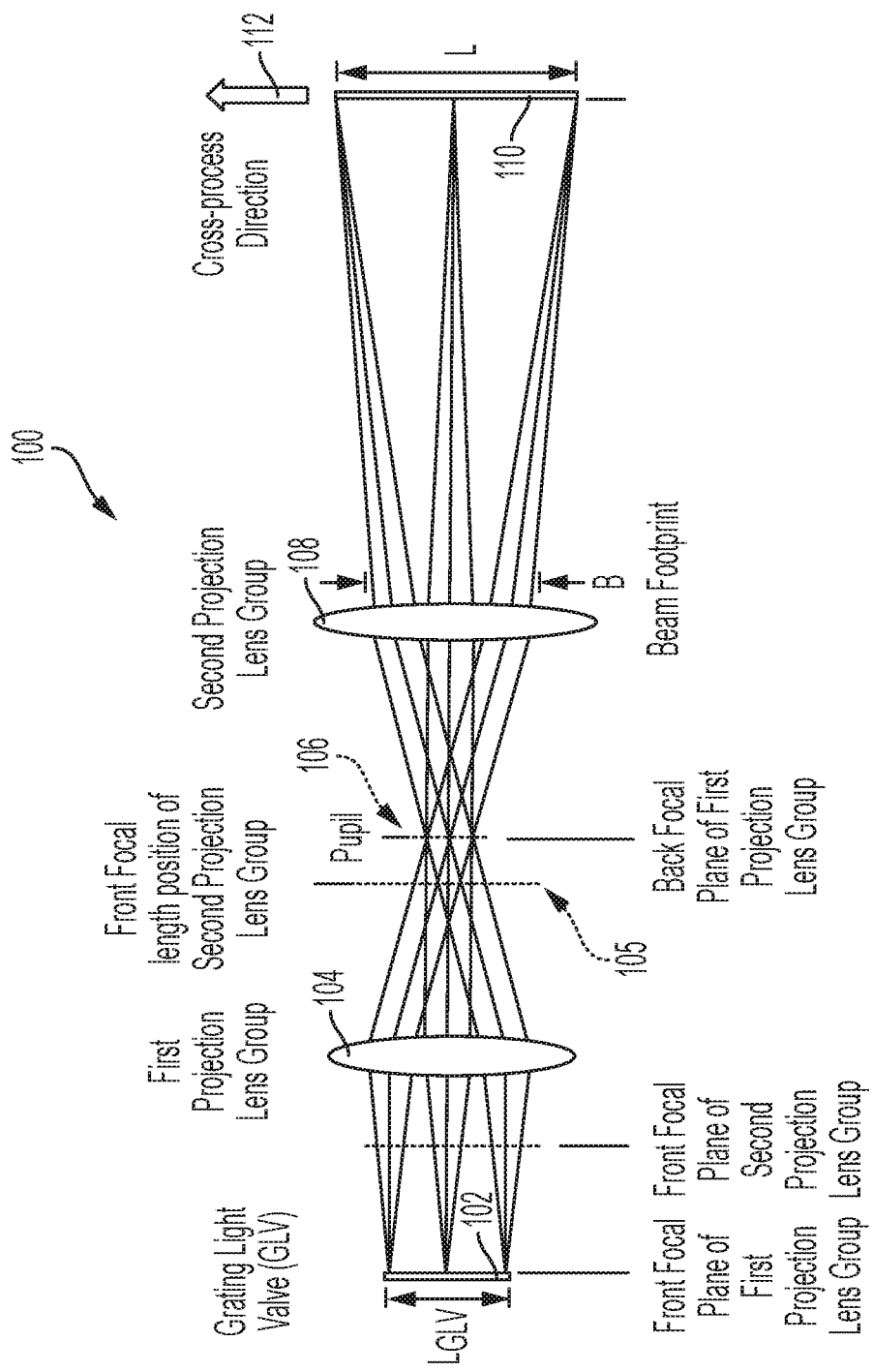
FIG. 1 illustrates a block diagram of a projection optical system, in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part. In addition, identical reference numerals utilized herein with respect to the drawings can refer to identical or similar parts or components.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The term "data" as utilized herein can relate to physical signals that can indicate or include information. The term "image" as utilized herein can relate to a pattern of physical light or a collection of data representing the physical light, and may include characters, words, and text as well as other features such as graphics.

The term grating light valve (GLV) as utilized herein relates to a type "micro projection" technology, which can operate using a dynamically adjustable diffraction grating.

The disclosed embodiments relate to an optical imager architecture and design comprising one or more imager modules that can be stacked to produce a seamless longer single image from in-line stitching of the individual module images. Each image module can include a laser light source, a collimator such as a fast-axis collimator (FAC) lens, an illumination optical system, a GLV (Grating Light Valve) spatial light modulator (SLM), and a projection optical system. Not that a laser diode array (LDA) is an example of a high power laser light source that can be adapted for use with one or more embodiments. For other types of laser sources, an aspheric lens may be used instead of a FAC lens.

The disclosed illumination system can homogenize, shape, and direct a light beam from the laser light source onto the GLV. The homogenization can occur in a cross-process direction. In the cross-process direction, the light beam can be shaped in a top hat irradiance profile or a near top-hat irradiance profile. In the process direction, the light beam can demonstrate a Gaussian irradiance profile. At the GLV, the illumination can be telecentric or near telecentric in the cross-process direction.

FIG. 1 illustrates a block diagram of a projection optical system 100, in accordance with an embodiment. The projection optical system 100 shown in FIG. 1 is an optical imager system that can include a GLV assembly 102 (e.g., a GLV spatial light modulator (SLM) assembly) having a length $L_{GLV}$, a first projection lens group 104, and a second projection lens group 108. A cross-process direction is indicated in FIG. 1 by arrow 112. Note that the term "GLV" as utilized herein can be utilized interchangeably with the terms "GLV assembly", and "GLV spatial light modulator" to refer to the same GLV component or feature. Note that an example of the GLV assembly 102 and features thereof are shown in greater detail in FIG. 11A, FIG. 11B, and FIG. 11C herein as a GLV SLM assembly.

The cross-process direction projection optical elements can image the GLV assembly 102 onto the image plane in the cross-process direction 112 as shown in FIG. 1. The cross-process direction projection optical elements can be divided into two (or more) groups of lenses—the first projection lens group 104 and the second projection lens group 108. The first projection lens group 104 can function as a positive lens that can form a pupil 106 in the cross-process direction 112 in the vicinity of the front focal plane of the first projection lens group 104 since the GLV illumination is telecentric or near telecentric in the cross-process direction 112. The second projection lens group 108 is also positive with the pupil 106 formed by the first projection lens group 104 positioned from the second projection lens group 108 less than, for example, 0.5 times the front focal length of the second projection lens group 108 as shown at position 105 in FIG. 1.

The second projection lens group 108 can focus the light from the first projection lens group 104 onto the image plane of the projection optical system 100. The second projection lens group 108 can also be designed to keep the cross-process direction beam footprint, B, at the second projection lens group 108 smaller than the cross-process direction image length, L, of the image at the image plane 110. The cross-process direction magnification can be equal to the negative ratio of the cross-process direction image length, L, divided by the illuminated length of the GLV, $L_{GLV}$. The projection optical system 100 preferably can have a cross-process direction magnification equal to −1.5 or higher in magnitude to ensure that the module image length, L, may be long enough to enable seamless stitching of the module images at the image plane.

The process direction projection optical system can image the GLV assembly 102 onto the image plane in the process direction. The process direction optical system can be composed of one or more elements. The magnification, $M_{XP}$, of the process direction elements can be determined by the negative ratio of the process direction beam width at the image plane divided by the process direction beam width at the GLV assembly 102.

Figure 2:
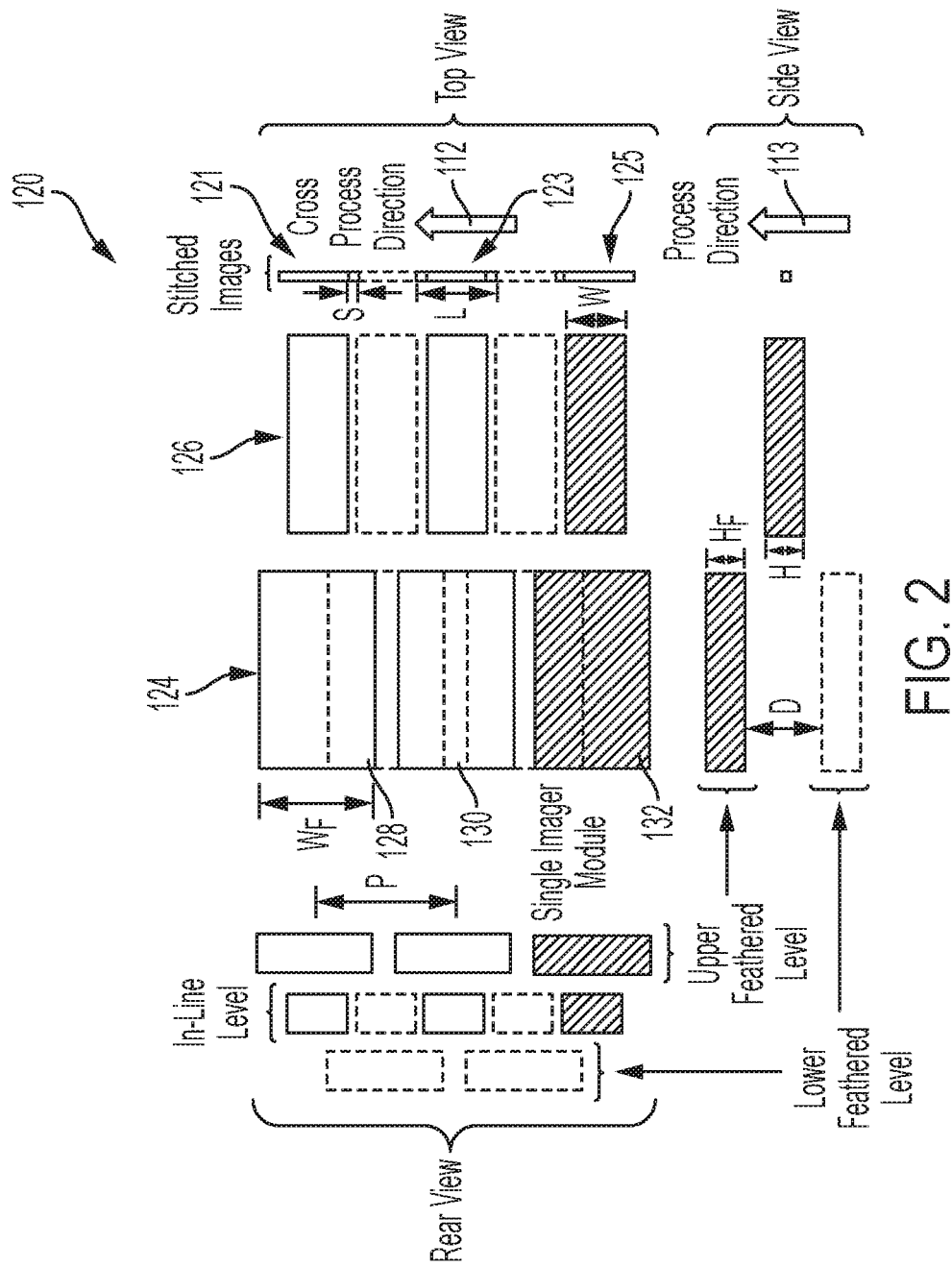
FIG. 2 illustrates a block diagram of the architecture of an optical imager system, in accordance with an embodiment.

FIG. 2 illustrates a block diagram of the architecture of an optical imager system 120, in accordance with an embodiment. The optical imager system 120 can be composed of a group of modules. Each module in this group can be organized mechanically into two sections: (1) a feathered module section 124, and (2) an in-line module section 126 as shown in FIG. 2. The optical imager system 120 can include an upper level group of imager modules and a lower group of imager modules. The upper level group can produce a pattern of alternating module images at the image plane. The lower level group of imager modules can produce a complementary pattern of alternating module images at the image plane that fill in the gaps of the alternating pattern of module images formed by the upper level group to produce a single seamless stitched line image.

The pitch, P, or spacing between adjacent modules in each level must be greater than the module width in the feathered module section, $W_F$. The cross-process direction magnification of each module can be selected so that the length, L, of the image produced by each module, which can be equal to the illuminated length, $L_{GLV}$, of the GLV, multiplied by the cross-process direction magnification, can be greater than half of the pitch. The width, W, of the in-line module section 126 can be less than the half of the pitch, P.

The distance, D, between the upper level and the lower level of the feathered module sections must be greater than the height, H, of the in-line module sections. This configuration can allow the modules to be stacked side-by-side in the feathered module section 124 and the in-line module section 126 while allowing the beams to be stitched in-line without any mechanical interference between imager modules. A group of stitched images 121, 123, and 125 is shown toward the right hand side of FIG. 2. Adjacent module images can have an overlap region, S=L−P/2, since the length of the image can be designed to be larger than half the pitch to ensure that the module images can be stitched.

The design parameters and constraints of the disclosed embodiments invention can be outlined as follows:

Illuminated length of GLV=$L_{GLV}$

Imager module cross-process direction image length=L

Projection optical system cross-process direction magnification=$M_{XP}$=−L/$L_{GLV}$ Projection optical system process direction magnification=$M_P$ Pitch or spacing between adjacent modules in each level=P Imager module width in the feathered section=$W_F$ Imager module height of the feathered section=$H_F$ Imager module width of the in-line section=W
Imager module height of the in-line section=H
Distance between upper and lower levels of the feathered sections=D
Second projection lens group cross-process direction beam footprint diameter=B
Adjacent module image overlap region=S=L−P/2
$|M_{XP}| \geq 1.5$
B<L
P>$W_F$
L>P/2
W<P/2
D>H The illumination is telecentric or near telecentric at the GLV assembly 102 in the cross-process direction. The first projection lens group 104 can function as a positive lens that can form the 106 pupil in the cross-process direction in the vicinity of the front focal plane of the first projection lens group 104 since the GLV illumination is telecentric or near telecentric in the cross-process direction.

The second projection lens group 108 can function as a positive lens with the pupil 106 formed by the first projection lens group 104 positioned from the second projection lens group 108 less than 0.5 times the front focal length of the second projection lens group 108. The second projection lens group 108 focuses the light from the first group onto image plane of the system.

Table 1 below presents an optical prescription of one embodiment. Table 1 specifies example parameters of an imager module optical design that can conform to the architecture and design constraints previously outlined herein.

TABLE 1

| Type | Comment | X-Radius (mm) | Y-Radius (mm) | Thickness (mm) | Material | Conic. Constant |
|---|---|---|---|---|---|---|
| OBJECT | LASER DIODE ARRAY | Infinity | Infinity | 0.107497 | | |
| PLANO | FAST AXIS COLUMATOR LENS-1 | Infinity | Infinity | 1.800000 | LAH60 | |
| Y-CYLINDRICAL | FAST AXIS COLUMATOR LENS-2 | −0.89312 | Infinity | 20.092503 | | −3.156401 |
| COORDBRx | | Infinity | Infinity | 0.000000 | | |
| X-CYLINDRICAL ARRAY | FLY'S EYE HOMOGENIZER-1 | Infinity | 0.75000 | 2.250000 | SILICA | −1.000000 |
| X-CYLINDRICAL ARRAY | FLY'S EYE HOMOGENIZER-2 | Infinity | −0.75000 | 0.000000 | | −1.000000 |
| COORDBRx | | Infinity | Infinity | 20.026335 | | 0.000000 |
| Y-CYLINDRICAL | L1-1 | 51.70000 | Infinity | 5.200000 | N-8 × 7 | 0.000000 |
| COORDBRx | L1-2 | Infinity | Infinity | 50.603087 | | 0.000000 |
| Y-CYLINDRICAL | L2-1 | −10.30000 | Infinity | 2.000000 | N-8 × 7 | 0.000000 |
| PLANO | L2-2 | Infinity | Infinity | 44.920578 | | 0.000000 |
| COORDBRx | | Infinity | Infinity | 0.000000 | | |
| PLANO | M1 | Infinity | Infinity | 0.000000 | MIRROR | 0.000000 |
| COORDBRK | | Infinity | Infinity | −24.407497 | | 0.000000 |
| PLANO | L3-1 | Infinity | Infinity | −2.300000 | N-8 × 7 | 0.000000 |
| SPHERICAL | L3-2 | 77.30000 | — | −13.292503 | | 0.000000 |
| COORDBRK | | Infinity | Infinity | 0.000000 | | |
| PLANO | M2 | Infinity | Infinity | 0.000000 | MIRROR | 0.000000 |
| COORDBRK | | Infinity | Infinity | 48.332578 | | 0.000000 |
| Y-CYLINDRICAL | L4-1 | 36.20000 | Infinity | 5.300000 | N-8 × 7 | 0.000000 |
| PLANO | L4-2 | Infinity | Infinity | 73.184919 | | 0.000000 |
| COORDBRx | | Infinity | Infinity | 0.000000 | | |
| PLANO | GLV WINDOW-1 | Infinity | Infinity | 1.100000 | N-8 × 7 | 0.000000 |
| PLANO | GLV WINDOW-2 | Infinity | Infinity | 0.100000 | | 0.000000 |
| COORDBRx | | Infinity | Infinity | 0.000000 | | 0.000000 |
| PLANO | GLV | Infinity | Infinity | 0.000000 | MIRROR | 0.000000 |
| COORDBRx | | Infinity | Infinity | −0.100000 | | 0.000000 |
| PLANO | GLV WINDOW-2 | Infinity | Infinity | −0.100000 | N-8 × 7 | 0.000000 |
| PLANO | GLV WINDOW-1 | Infinity | Infinity | 0.000000 | | 0.000000 |
| COORDBRx | | Infinity | Infinity | −29.258594 | | 0.000000 |
| PLANO | L5-1 | Infinity | Infinity | −7.280000 | N-8 × 7 | 0.000000 |
| X-CYLINDRICAL | L5-2 | Infinity | 77.55000 | −59.453286 | | 0.000000 |
| PLANO | L6-1 | Infinity | Infinity | −9.670000 | N-8 × 7 | 0.000000 |
| Y-CYLINDRICAL | L6-2 | 51.70000 | Infinity | −17.042327 | | 0.000000 |
| X-CYLINDRICAL | L7-1 | Infinity | −77.55000 | −7.280000 | N-8 × 7 | 0.000000 |
| PLANO | L7-2 | Infinity | Infinity | −40.315793 | | 0.000000 |
| PLANO | APERTURE STOP | Infinity | Infinity | −48.455230 | | 0.000000 |
| PLANO | L8-1 | Infinity | Infinity | −7.280000 | N-8 × 7 | 0.000000 |
| X-CYLINDRICAL | L8-2 | Infinity | 77.55000 | −17.720000 | | 0.000000 |
| COORDBRx | | Infinity | Infinity | 0.000000 | | |
| PLANO | M3 | Infinity | Infinity | 0.000000 | MIRROR | 0.000000 |
| COORDBRx | | Infinity | Infinity | 85.817343 | | 0.000000 |
| COORDBRx | | Infinity | Infinity | 0.000000 | | |
| PLANO | M4 | Infinity | Infinity | 0.000000 | MIRROR | 0.000000 |
| COORDBRx | | Infinity | Infinity | −44.424843 | | 0.000000 |

TABLE 1-continued

| Type | | | | | | |
|---|---|---|---|---|---|---|
| Y-CYLINDRICAL PLANO | L9-1 | −45.57100 | Infinity | −5.000000 | N-5F57 | 0.000000 |
| | L9-2 | Infinity | Infinity | −53.312094 | | 0.000000 |
| IMAGE | | Infinity | Infinity | 0.000000 | | 0.000000 |

| Type | 4th Order Term | 6th Order Term | 8th Order Term | 10th Order Term | Tilt About X (deg) |
|---|---|---|---|---|---|
| OBJECT PLANO | | | | | |
| Y-CYLINDRICAL | −0.484677 | 0.374485 | −0.396653 | 0.165246 | |
| COORDBRx | | | | | |
| X-CYLINDRICAL ARRAY | | | | | |
| X-CYLINDRICAL ARRAY | | | | | |
| COORDBRx | | | | | |
| Y-CYLINDRICAL | | | | | |
| COORDBRx | | | | | |
| Y-CYLINDRICAL PLANO | | | | | −45.00 |
| COORDBRx PLANO | | | | | −45.00 |
| COORDBRK PLANO | | | | | −45.00 |
| SPHERICAL | | | | | |
| COORDBRK PLANO | | | | | −57.00 |
| COORDBRK | | | | | −57.00 |
| Y-CYLINDRICAL PLANO | | | | | |
| COORDBRx PLANO | | | | | 12.00 |
| PLANO | | | | | |
| COORDBRx PLANO | | | | | |
| COORDBRx PLANO | | | | | |
| COORDBRx PLANO | | | | | 12.00 |
| X-CYLINDRICAL PLANO | | | | | |
| Y-CYLINDRICAL | | | | | |
| X-CYLINDRICAL PLANO | | | | | |
| PLANO | | | | | |
| PLANO | | | | | |
| X-CYLINDRICAL | | | | | |
| COORDBRx PLANO | | | | | −45.00 |
| COORDBRx | | | | | −45.00 |
| COORDBRx PLANO | | | | | 45.00 |
| COORDBRx | | | | | 45.00 |
| Y-CYLINDRICAL PLANO IMAGE | | | | | |

Figure 3:
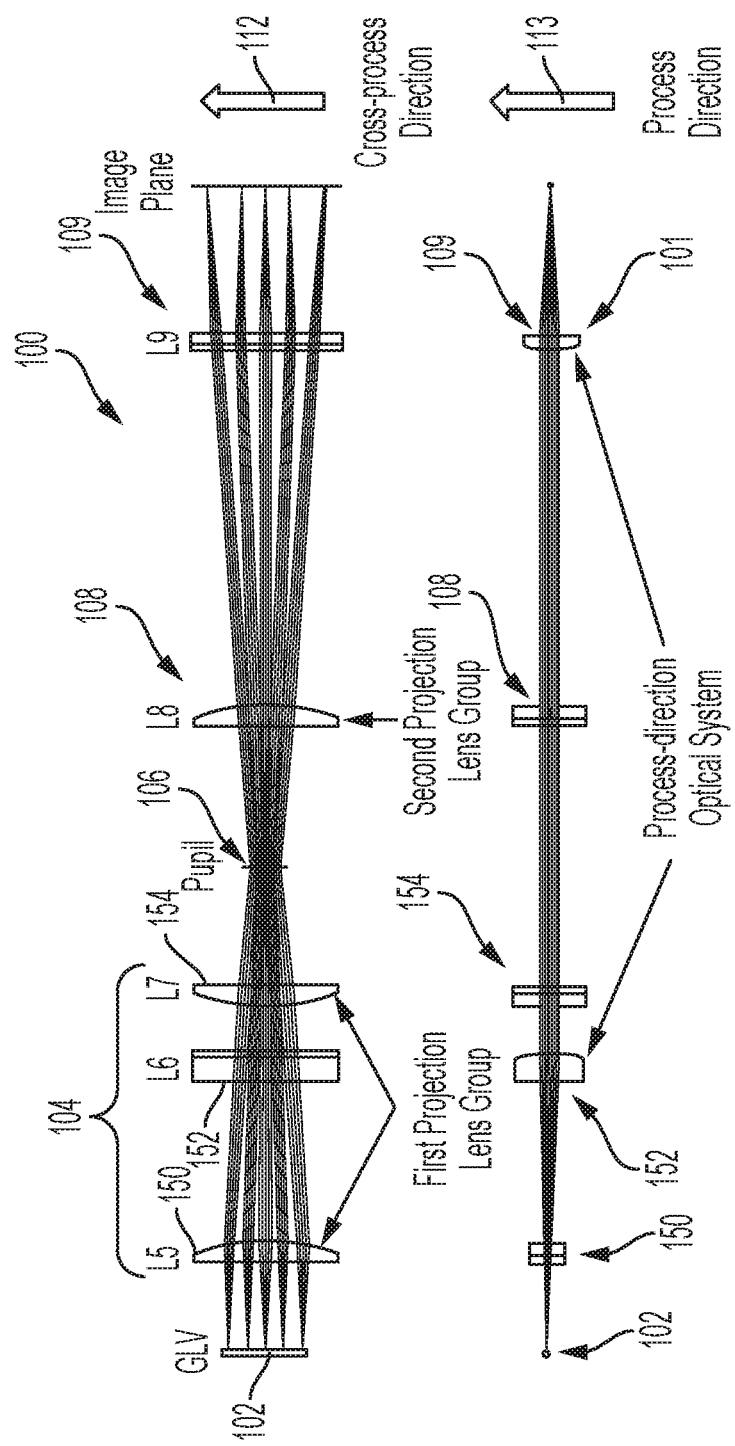
FIG. 3 illustrates a schematic diagram depicting an unfolded view of an optical imager system that can include a projection optical system and a process-direction optical system, in accordance with an embodiment.

FIG. 3 illustrates a schematic diagram depicting an unfolded view of an optical imager system that can include a projection optical system 100 and a process-direction optical system 101, in accordance with an embodiment. The projection optical system 100 functions as an imager module projection optical system. The process-direction optical system 101 can be implemented based on common elements found in the projection optical system 100. FIG. 3 thus shows an unfolded layout of the imager module.

As depicted in FIG. 3, the first projection lens group 104 can include one or more lens including a lens 150 (L5), and/or a lens 154 (L7). The pupil 106 is also shown in FIG. 3 with respect to the second projection lens group 108, which may include lens L8. Note that although a single lens L8 is shown in FIG. 3, it can be appreciated that the second projection lens group 108 may include a single lens such as lens L8 and/or other lens components. An additional lens 109 (L9) may be included as a part of the imager module projection optical system 100. The cross-process direction 112 is also depicted in FIG. 3 with respect to the projection optical system 100.

Note that the term "component" as utilized herein can relate to a part of a whole thing or one of the parts of a system, process, or machine. Thus, a lens, a mirror and so on are examples of "components".

The process-direction optical system 101 can also be implemented with, for example, the lens 152, and the lens 109, as shown in FIG. 3. The process direction 113 is depicted in FIG. 3 with respect to the process-direction optical system 101. Both the process-direction optical system 101 and the projection optical system 100 are examples of different systems that can be implemented based on common components such as lenses, etc.

Figure 4:
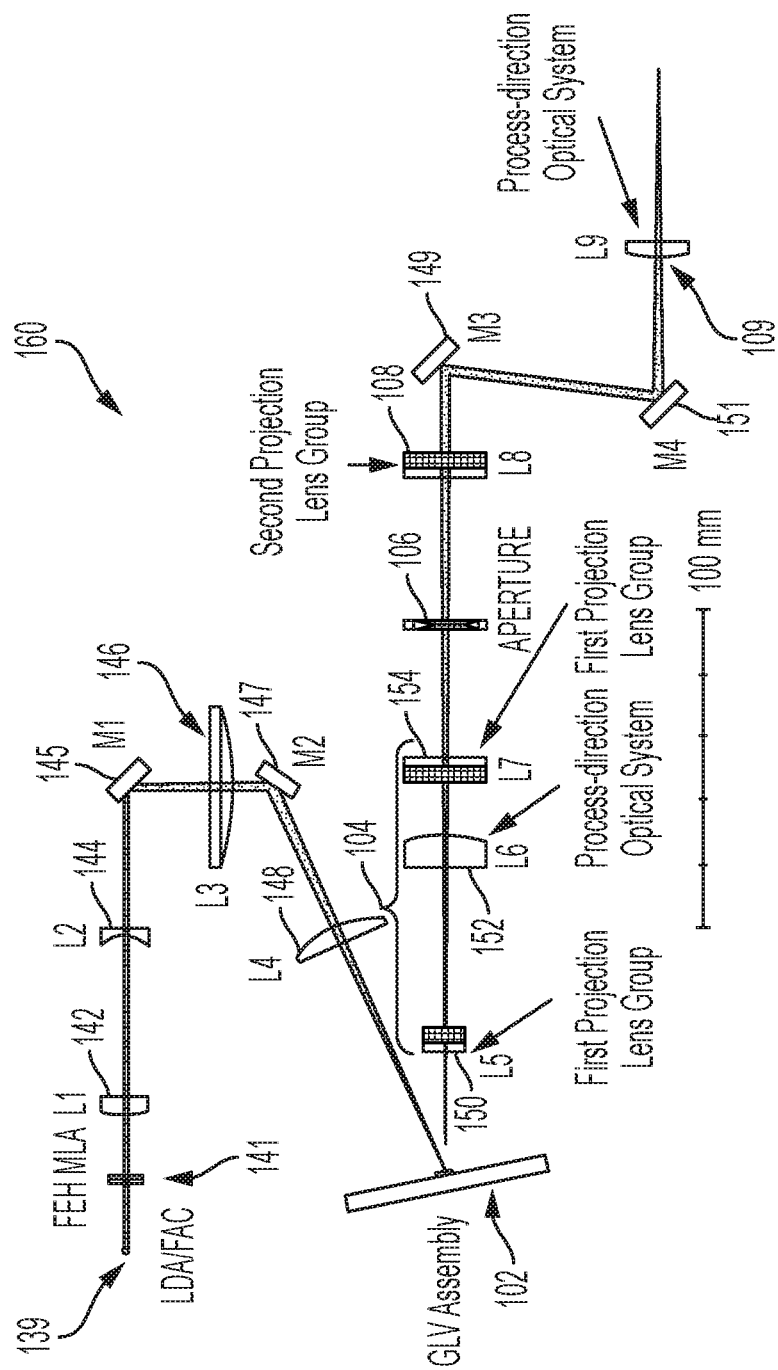
FIG. 4 illustrates a schematic diagram of a side view of an imager module optical system, in accordance with an embodiment.
Figure 5:
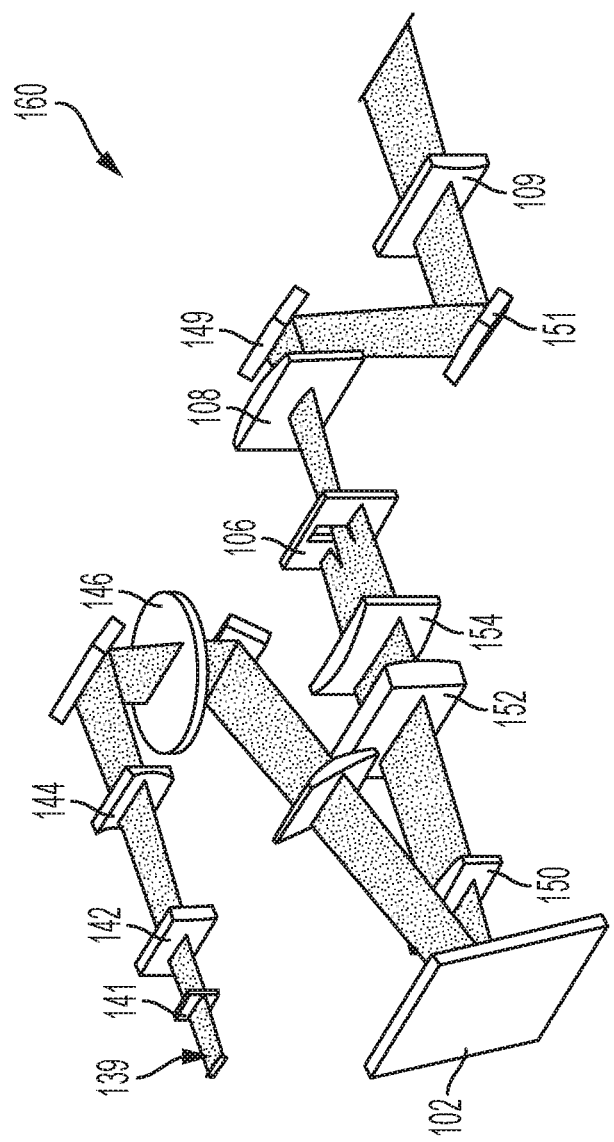
FIG. 5 illustrates a schematic diagram of an imager module optical system, in accordance with an embodiment.

FIG. 4 illustrates a schematic diagram depicting the side view of an imager module optical system 160, in accordance with an embodiment. FIG. 5 illustrates a schematic diagram depicting a side perspective view of the imager module optical system 160. Note that the imager module optical system 160 depicted in FIG. 4 and FIG. 5 illustrates embodiments of an optical imager system that are slightly different from the embodiments shown in FIG. 1, FIG. 2, and FIG. 3, but which can contain one or more similar and common components and elements. FIG. 4 and FIG. 5 thus illustrate the layout of the imager module.

The imager module optical system 160 shown in FIG. 4 and FIG. 5 can include an illumination optical system comprising a LDA (Laser Diode Array) and FAC (Fast-Axis Collimator) lens 139 and an FEH (Fly's Eye Homogenizer) MLA (Micro Lens Array) 141, which are depicted as located to the left of the lens 142 (i.e., lens L1) and the lens 144 (i.e., lens L2). A mirror 145 (i.e., mirror M1) is shown in FIG. 4 as located to the right of the lens 144. A lens 146 (i.e., lens L3) and a mirror 147 (i.e., mirror M2) can also be included as a part of the imager module optical system 160. A lens 148 (i.e., lens L4) is shown located to the left of the mirror 147. For other types of lasers (e.g., fiber laser, fiber-coupled laser, diode-pumped solid-state laser, diode laser, etc.) the FAC and FEH can be replaced by an aspheric collimator lens and FEH, or an aspheric collimator lens and a Powell lens.

Note that an LDA is an example of a laser light source that can be implemented in accordance with an embodiment. An FAC is an example of a collimator that can be implemented in accordance with an embodiment. It should be appreciated that other types of laser light sources and collimators can be adapted for use with different embodiments, and that the disclosed embodiments are not limited to the use of only an LDA and FAC lens implementation.

The imager module optical system 160 can further include the GLV or GLV assembly 102 as in the previously discussed embodiments, along with the lens 150 (i.e., lens L5), the lens 152 (i.e., lens L6), and the lens 154 (i.e., lens L7), and so on. The first projection lens group 104 is depicted in FIG. 4 to the left of the pupil 106 (i.e., aperture), which in turn is illustrated as located to the left of the second projection lens group 108 (i.e., lens 108). A mirror 149 (i.e., mirror M3) is shown to the right of the second projection lens group 108. Finally, a mirror 151 (i.e., mirror M4) and a lens 109 (i.e., lens 109) are shown at the bottom right hand side of FIG. 4. Note that the process-direction optical system comprising the lens 152 (i.e., L6) and the lens 109 (i.e., L9), is also identified in FIG. 4.

Figure 6:
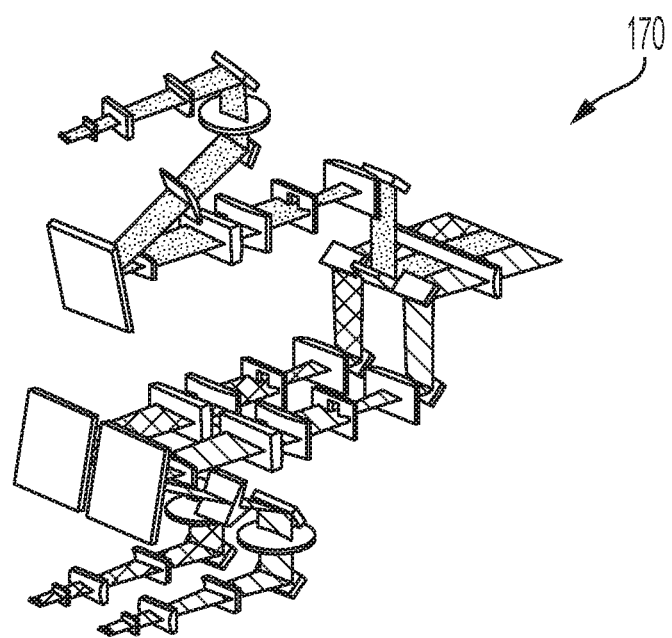
FIG. 6 illustrates a schematic diagram of a three-imager module in-line stitched image optical system, in accordance with an embodiment.
Figure 7:
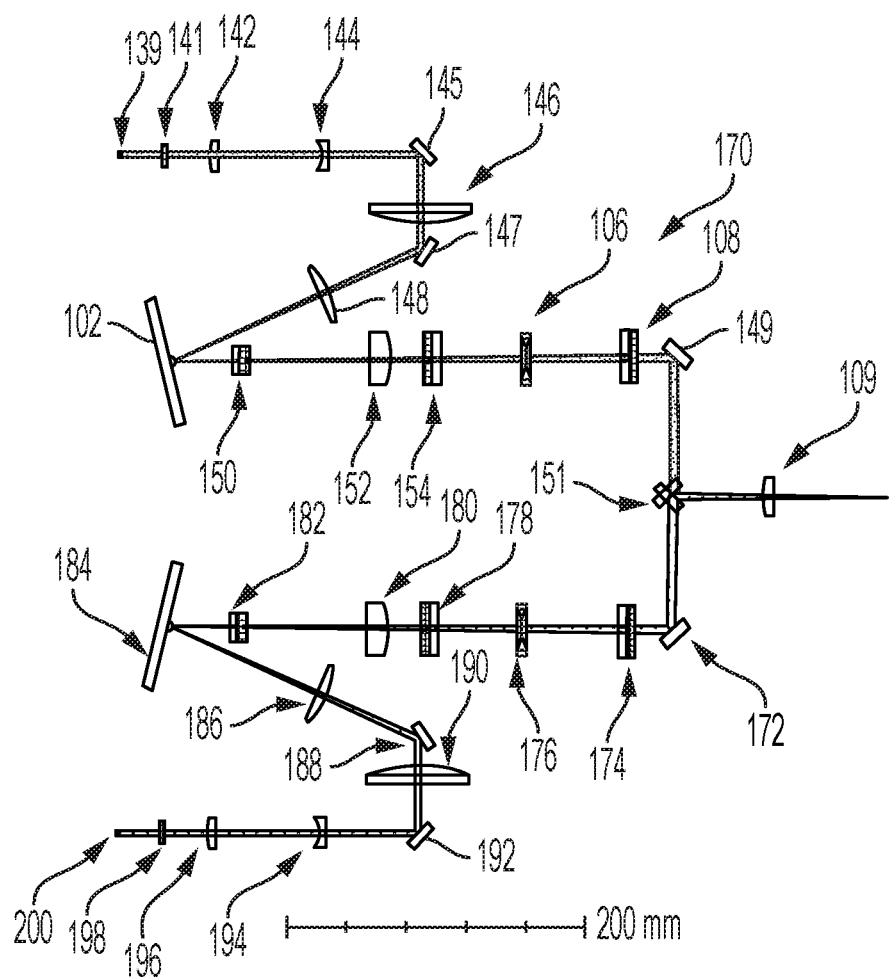
FIG. 7 illustrates a schematic diagram of a side view of a three-imager module in-line stitched image optical system, in accordance with an embodiment.

FIG. 6 illustrates a schematic diagram of side perspective view a three-imager module in-line stitched image optical system 170, in accordance with an embodiment. FIG. 7 illustrates a schematic diagram of a side view of the three-imager module in-line stitched image optical system 170 depicted in FIG. 6, in accordance with an embodiment. Note that the configuration shown in FIG. 6 depicts the imager module in-line stitched image optical system 170 without reference numerals to provide a more realistic and fuller view of the imager module in-line stitched image optical system 170. The configuration shown in FIG. 7, however, does depict the imager module in-line stitched image optical system 170 with its components identified by reference numerals.

The imager module in-line stitched image optical system 170 is an optical imager system that includes components common to the previously illustrated and described embodiments, such as the LDA/FAC 129, the FEH MLA 141, the lens 142, the lens 144, the mirror 145 and so on. The imager module in-line stitched image optical system 170 can include additional components that were not previously discussed herein, such as a mirror 172, a lens 174, an aperture 176, a lens 178, a lens 180, a lens 182 and a GLV assembly 184. The imager module in-line stitched image optical system 170 can further include a lens 186, a mirror 188, a lens 190, a mirror 192, a lens 194, a lens, 196, an FEH MLA 198, and an LDA/FAC lens 139.

Figure 8:
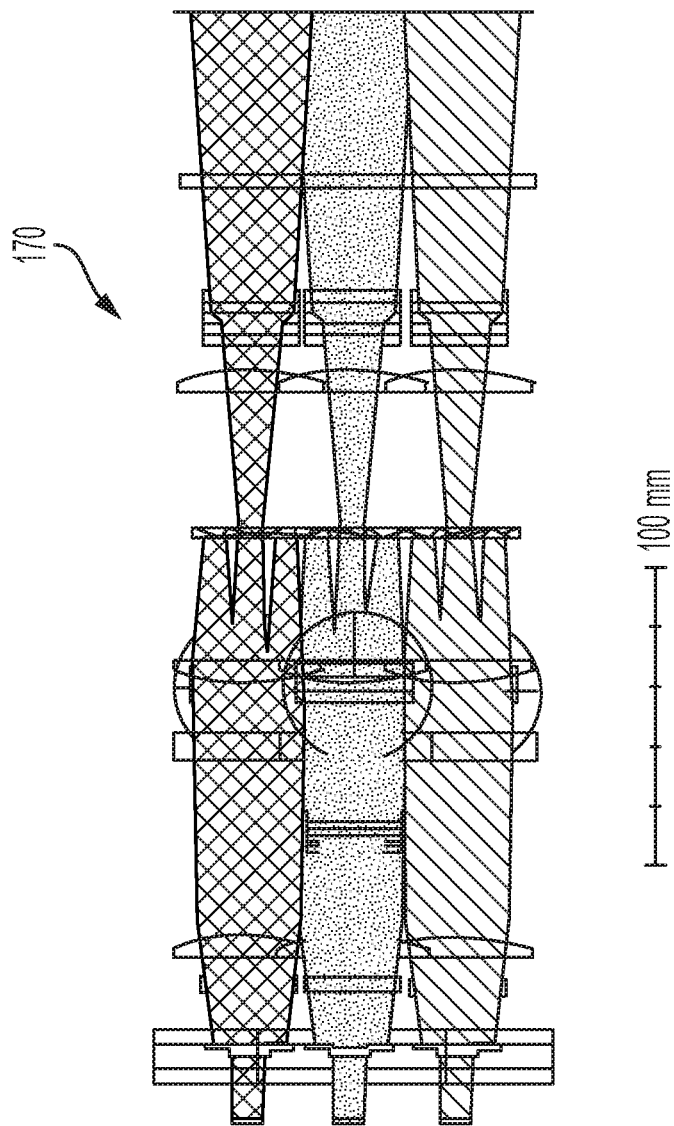
FIG. 8 illustrates a schematic diagram of a top view of a three-imager module in-line stitched image optical system, in accordance with an embodiment.
Figure 9:
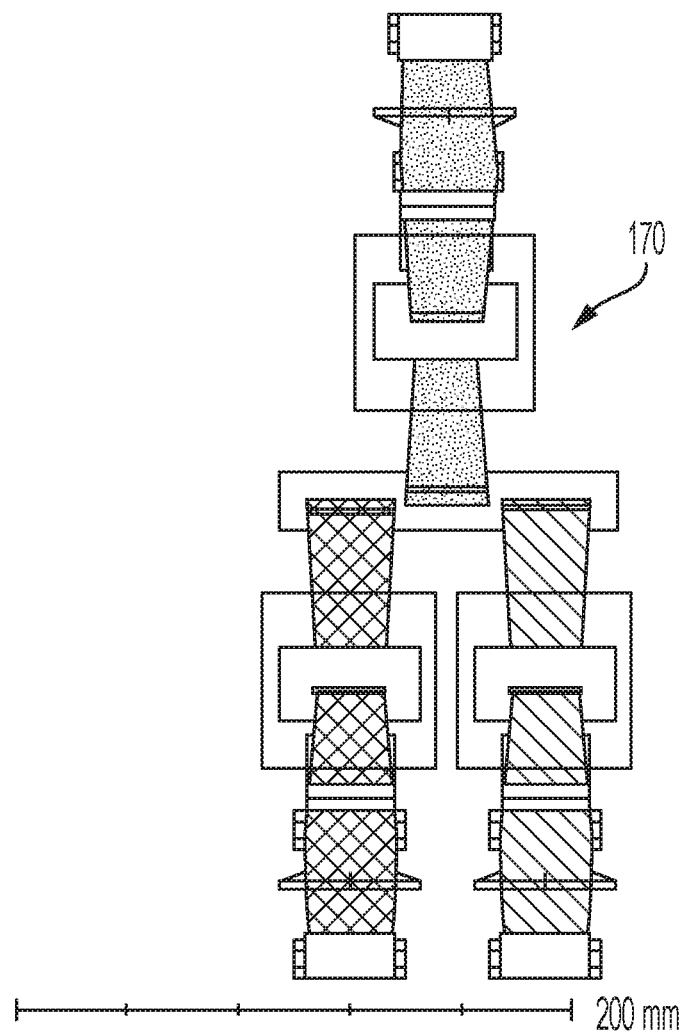
FIG. 9 illustrates a schematic diagram of a top view of a three-imager module in-lined stitched image optical system, in accordance with an embodiment.

FIG. 8 illustrates a schematic diagram of a top view of the three-imager module in-line stitched image optical system 170, in accordance with an embodiment. FIG. 9 illustrates a schematic diagram of another top view of the three-imager module in-lined stitched image optical system 170, in accordance with an embodiment. The views shown in FIG. 8 and FIG. 9 depict different perspectives of the three-imager module in-line stitched image optical system 170 discussed above. Specific reference numerals are not shown in FIG. 8 and FIG. 9 in order to provide more unobstructed and overall views of the three-imager module in-line stitched image optical system 170. FIG. 5 and FIG. 8 illustrate the function of the aperture 106 in each module. When the GLV pixels are in the ON state (alternating GLV pixel ribbons not pulled down or not deflected) the reflected light from the pixels pass through the aperture opening. When the GLV pixels are in the OFF state (alternating GLV ribbons pulled down or deflected) the diffracted light from the pixels fall outside the aperture opening and are blocked by the aperture.

Figure 10:
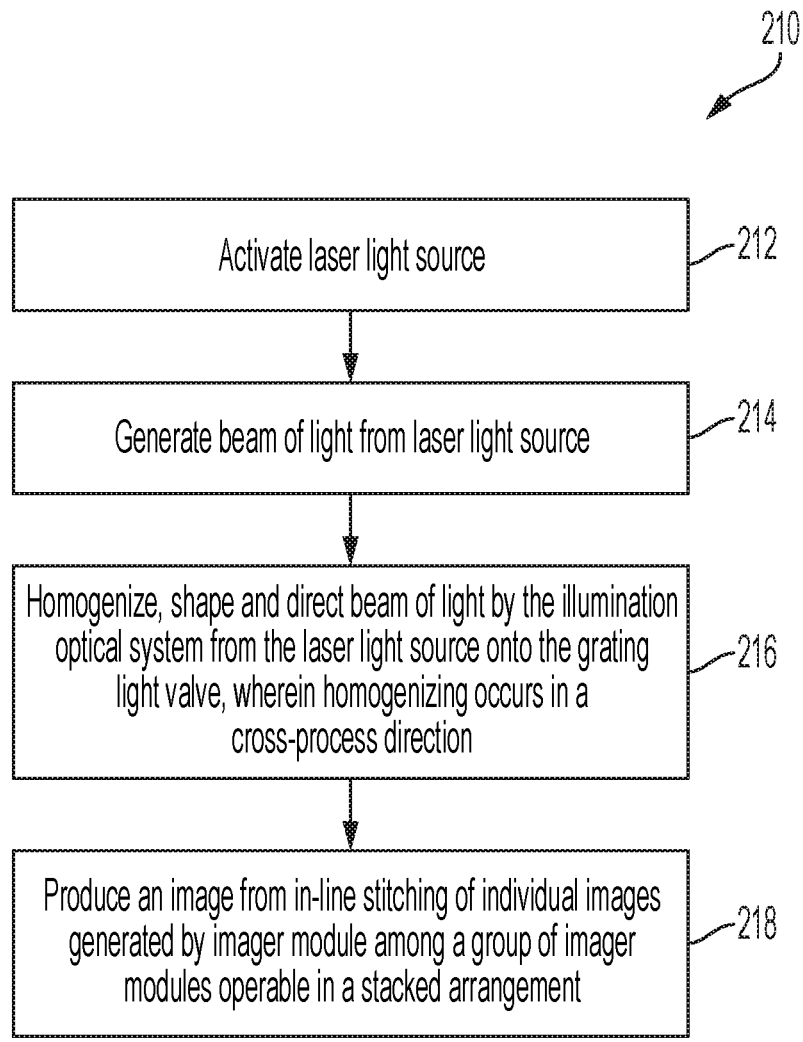
FIG. 10 illustrates a flow chart of operations depicting logical operational steps of a method for operating an optical imager system, in accordance with an embodiment.

FIG. 10 illustrates a flow chart of operations depicting logical operational steps of a method 210 for operating an optical imager system, in accordance with an embodiment. As depicted at block 212, a laser light source can be activated, which functions as a part of an imager module that includes the laser light source, a collimator, an illumination optical system, a grating light valve, a spatial light modulator and a projection optical system. The laser light source can be, for example, a laser diode array. The collimator may be, for example, a fast-axis collimator lens or an aspheric collimator lens. Thereafter, as illustrated at block 214, a beam of light can be generated by the laser light source.

Next, as illustrated at block 216, steps or operations can be implemented for homogenizing, shaping and directing a beam of light by the illumination optical system from the laser light source onto the grating light valve, wherein the homogenizing occurs in a cross-process direction. Then, as shown at block 218, a step or operation can be implemented in which an image is produced from in-line stitching of individual images generated by the imager module among a plurality of imager modules operable in a stacked arrangement to produce the image from the in-line stitching of individual images generated by the at least one imager module.

Based on the foregoing, it can be appreciated that an optical imager system is disclosed, which can produce a single seamless pixelated one-dimensional line image that can extend in a cross-process direction on an imaging surface from in-line stitching of shorter individual images on the same imaging surface. Such an optical imager system can include individual modules that can illuminate and image one or more GLV spatial light modulators. Each imaging module can include a laser light source, a collimator lens, an illumination optical system, a GLV spatial light modulator, and a projection optical system. In addition, each imaging module can be organized mechanically into two sections: (1) the previously discussed feathered section, and (2) the previously discussed in-line section, which can be sized and arranged in upper and lower levels that can enable stacking of the imager modules in a manner that avoids mechanical interference between modules.

The disclosed embodiments thus illustrate an optical system design and architecture that can create a seamless pixelated line image through in-line combination of smaller pixelated line images from independent modules that use a GLV spatial light modulator. Current systems utilize barber polling or staggered imager modules to generate a complete image by combining smaller images that are offset in the process direction.

The disclosed embodiments can implement an optical design with a projection optical system, with a cross-process direction magnification, $M_{XP}$, equal to −1.5 or higher in magnitude, combined with a laser illumination optical system, GLV spatial light modulator, and fold mirrors that separate an in-line section of the imager from the feathered section of the imager. This optical system architecture can enable the stacking of imager modules to produce a seamless pixelated line image formed by the in-line stitching of smaller pixelated line images from the imager modules in a manner that avoids mechanical interference between modules.

Figure 11A:
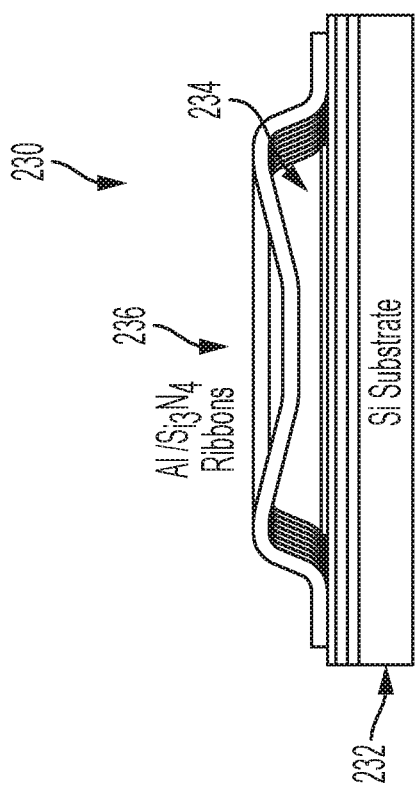
FIG. 11A illustrates a side view of a portion of a GLV spatial light modulator (SLM) assembly, which can be implemented in accordance with an embodiment.

FIG. 11A illustrates a side view of a portion 230 of the GLV assembly 102 discussed earlier, which can be implemented in accordance with an embodiment. The GLV assembly 102 shown in FIG. 11A can be configured as a GLV ribbon array. In the example shown in FIG. 11A, a group of Al/Si3N4 ribbons 236 can be disposed above a silicon substrate 232 and a gap 234 disposed between the silicon substrate 232 and the group of Al/Si3N4 ribbons 236.

Figure 11B:
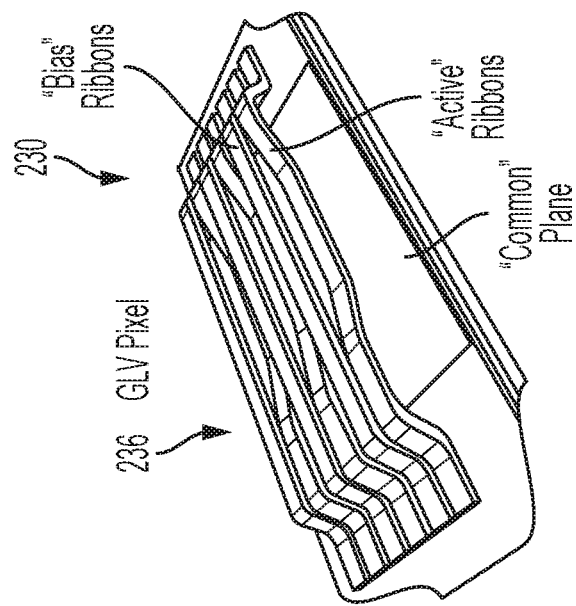
FIG. 11B illustrates a top perspective of the portion of the GLV spatial light modulator (SLM) assembly shown in FIG. 11B, in accordance with an embodiment.

FIG. 11B illustrates a top perspective view of the portion 230 of the GLV assembly 102, in accordance with an embodiment. In the top perspective view shown in FIG. 11B, "Bias" ribbons the group of Al/Si3N4 ribbons 236 are identified with respect to the curved "Active" ribbons group of Al/Si3N4 ribbons 236 and a "Common" plane, which may be grounded. The "Bias" ribbons are indicated as grounded, while the "Active" ribbons are indicated as tied to or having a voltage +V. The "Active" ribbons are shown as curved or in a deflected state while the "Bias" ribbons are depicted as straight or flat.

Figure 11C:
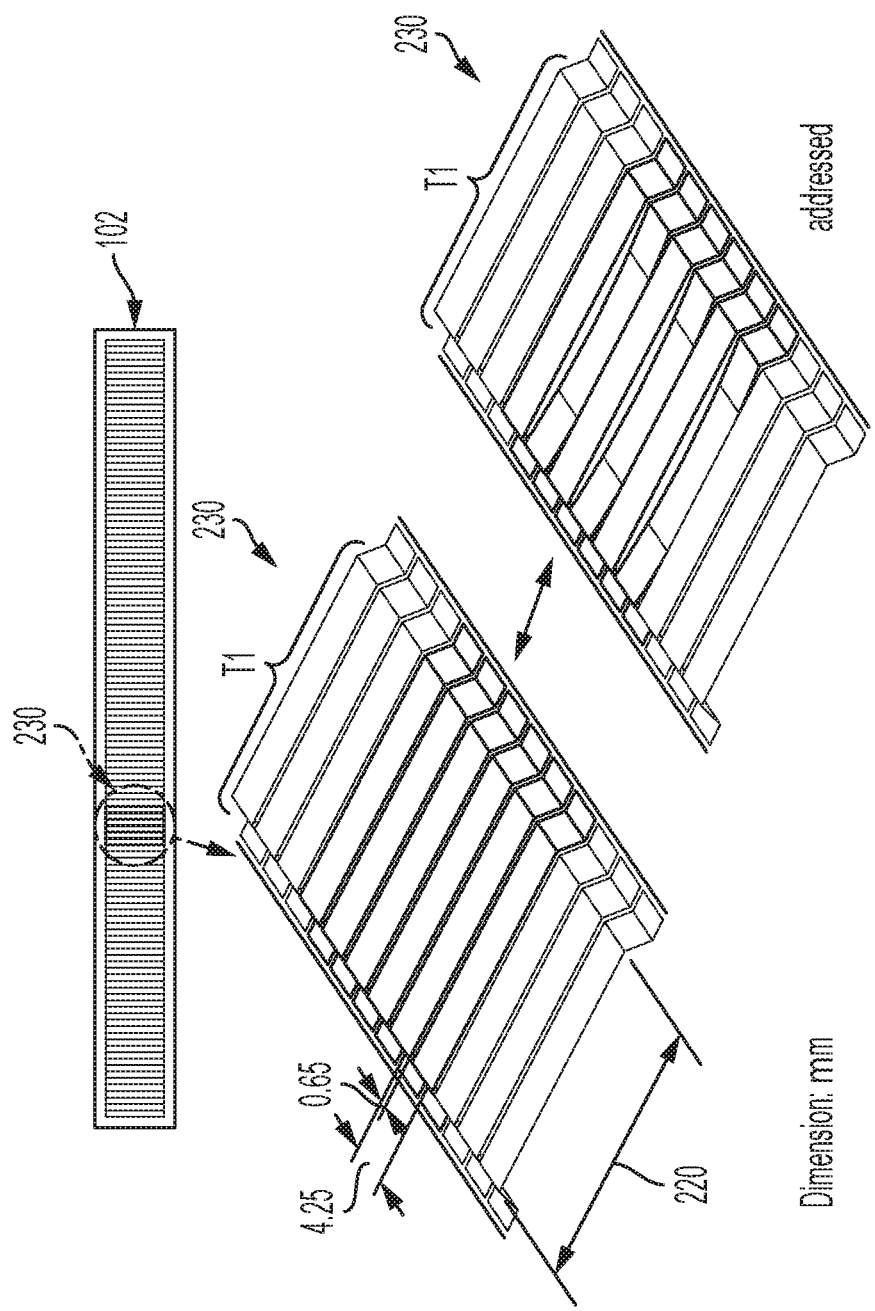
FIG. 11C illustrates a top view of the GLV spatial light modulator (SLM) assembly, in accordance with an example embodiment.

FIG. 11C illustrates a top view of the GLV assembly 102 (e.g., GLV ribbon array), in accordance with an example embodiment. In FIG. 11C, the portion 230 of the GLV assembly 102 is also shown at time T1 (prior to bending of the "Active" ribbons) and at time T2 (after the "Active" ribbons" have been bent or deflected). FIG. 11C thus depicts the GLV ribbon array in both flat (T1) and deflected states (T2). It should be appreciated that the dimensions shown in FIG. 11C are provided for illustrative purposes only and are not considered limiting features of the disclosed embodiments.

Figures 12A, 12B:
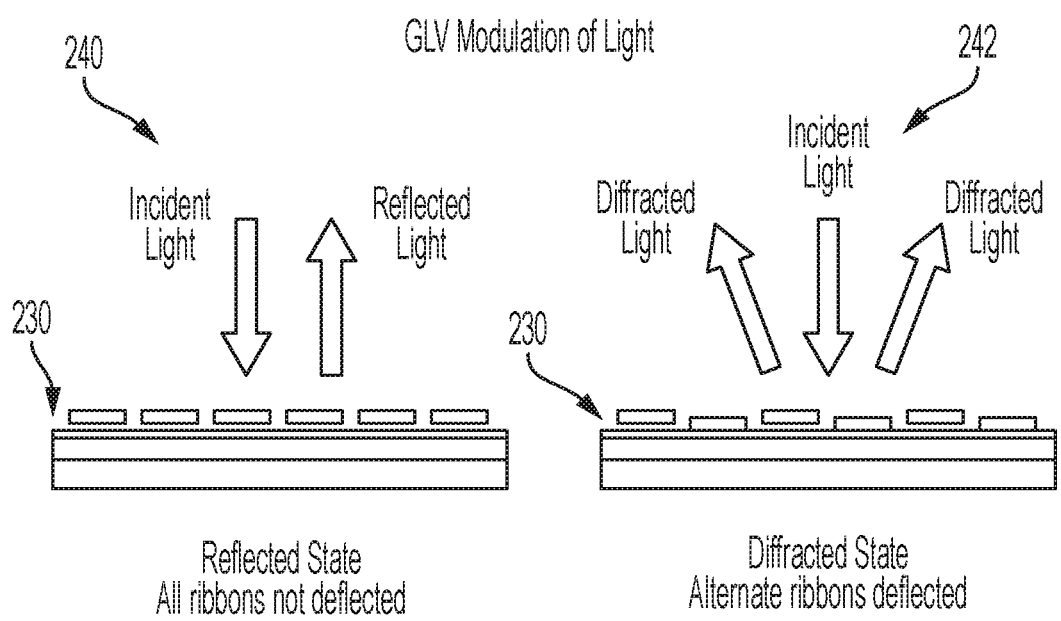
FIG. 12A illustrates a side view of the portion of the GLV assembly shown in FIGS. 11A, 11B, and 11C, in accordance with an embodiment.
FIG. 12B illustrates a side view of the portion of the GLV assembly shown in FIGS. 11A, 11B, and 11C, in accordance with an embodiment.

FIG. 12A illustrates a side view 240 of the portion 230 of the GLV assembly 102 shown in FIGS. 11A, 11B, and 11C, in accordance with an embodiment. The side view 240 depicted in FIG. 12A demonstrates the GLV modulation of light in a reflective state with all ribbons not deflected. Arrows are depicted in FIG. 12 A showing the incidence light and the reflected light.

FIG. 12B illustrates a side view 242 of the portion 230 of the GLV assembly 102 shown in FIGS. 11A, 11B, and 11C, in accordance with an embodiment. The side view 240 depicted in FIG. 12A demonstrates the GLV modulation of light in a diffractive state with all ribbons reflected. Arrows are depicted in FIG. 12B indicating the diffracted light and the incident light.

It should be appreciated that the disclosed embodiments can be implemented in a variety of applications, including but not limited to the field of printing. In particular, the disclosed embodiments can be implemented with a digital offset or digital architecture printing system, which may be used for printing with lithographic inks. Digital offset printing processes may include, for example, applying a fountain solution to a surface of an imaging plate. The imaging plate may be arranged on an outer portion of an imaging cylinder. The imaging cylinder may be rotatable for bringing regions of the imaging plate surface to pass adjacent subsystems, including: a dampener for applying fountain solution; an imaging system for imaging or image-wise vaporization of fountain solution from select regions of the imaging plate; an inker for applying ink to the imaging plate surface; a transfer station from which an ink image can be transferred to a printable medium; and a cleaner for removing residue from a surface of the image plate and preparing the surface to begin the process anew.

After applying the fountain solution, an imaging system composed of a high power laser may be used to image-wise vaporize fountain solution from select regions of the surface. Light energy can be absorbed by the imaging plate, which may comprise silicone, to locally heat and boil off fountain solution from the plate surface. The laser may be used for vaporizing the fountain solution at select surface regions in accordance with digital image data. Ink may be applied by the inker, and may be deposited on regions where fountain solution has been vaporized from the imaging plate. Conversely, ink may be rejected by regions of the imaging plate surface where fountain solution remains. A resulting image can be transferred at the transfer station to paper or other suitable media by way of pressure. For the imaging step, an imaging system may be used that is configured to operate, for example, according to the various steps, instructions, and operations shown and described herein (e.g., see FIG. 10).

Figure 13:
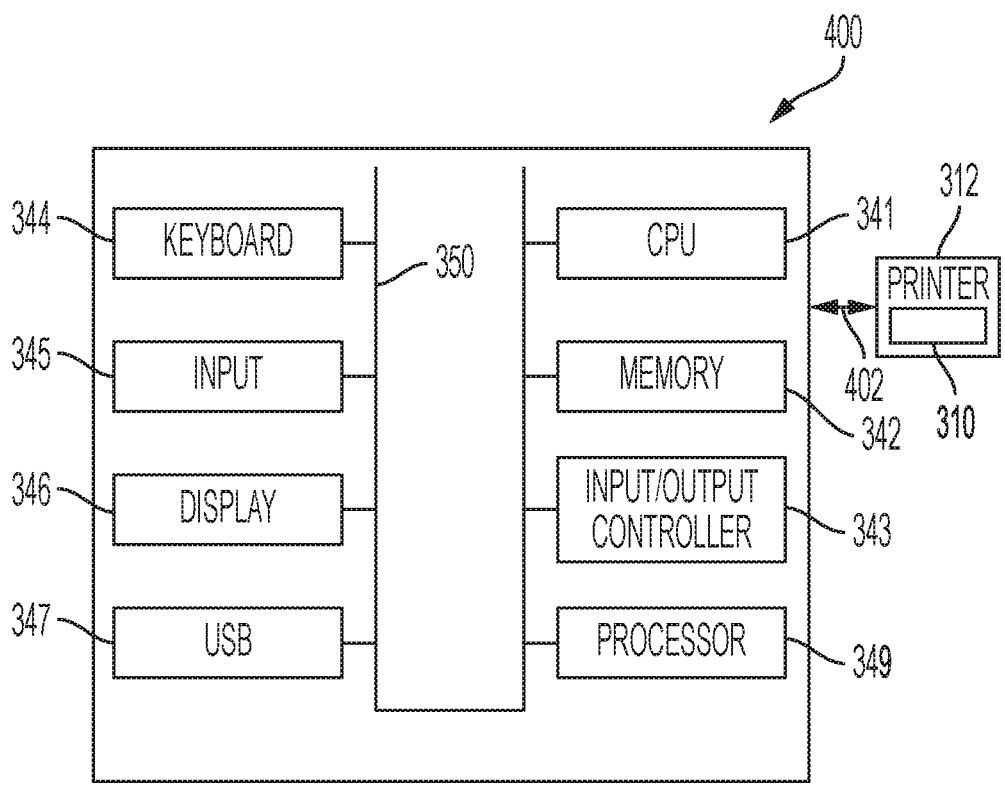
FIG. 13 illustrates a schematic view of a software system including a module, an operating system, and a user interface, in accordance with an embodiment.

As can be appreciated by one skilled in the art, some embodiments may be implemented in the context of a method, data processing system, or computer program product that directs the operations of a printing system such as described above, including an associated optical imager system. An example of such a printing system is depicted in FIG. 13 as a printer 310 and an example of an associated optical imager system is also shown in FIG. 13 as the optical imager system 310.

Accordingly, embodiments may take the form of an entirely hardware embodiment, an entirely software embodiment or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in procedural programming languages or in a visually oriented programming environment.

The program code may execute entirely on a user's computer, partly on a user's computer, as a stand-alone software package, partly on a user's computer and partly on a remote computer or entirely on the remote computer. In the latter scenario, the remote computer may be connected to a user's computer through a bidirectional data communications network (e.g., a local area network (LAN), wide area network (WAN), wireless data network, a cellular network, etc.) or the bidirectional connection may be made to an external computer via most third party supported networks (e.g., through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks. To be clear, the disclosed embodiments can be implemented in the context of, for example a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts described herein or carry out combinations of special purpose hardware and computer instructions.

Figure 14:
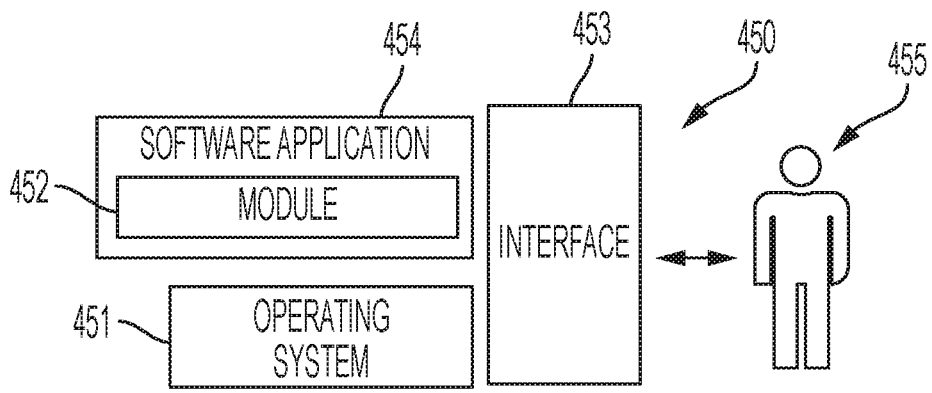
FIG. 14 illustrates a computer software system for directing the operation of the data-processing system depicted in FIG. 13, in accordance with an embodiment.

FIG. 13 and FIG. 14 are shown only as exemplary diagrams of data-processing environments in which example embodiments may be implemented. It should be appreciated that FIG. 13 and FIG. 14 are only exemplary and are not intended to assert or imply any limitation with regard to the environments in which aspects or embodiments may be implemented. Many modifications to the depicted environments may be made without departing from the spirit and scope of the disclosed embodiments.

As illustrated in FIG. 13, some embodiments may be implemented in the context of a data-processing system 400 that can include, for example, one or more processors including a CPU (Central Processing Unit) 341 and/or other another processor 349 (e.g., microprocessor, microcontroller etc), a memory 342, an input/output controller 343, a peripheral USB (Universal Serial Bus) connection 347, a keyboard 344 and/or another input device 345 (e.g., a pointing device such as a mouse, trackball, pen device, etc.), a display 346 (e.g., a monitor, touch screen display, etc) and/or other peripheral connections and components. FIG. 13 depicts an example of a computing device that can be adapted for use in accordance with one possible embodiment.

As illustrated, the various components of data-processing system 400 can communicate electronically through a system bus 350 or similar architecture. The system bus 350 may be, for example, a subsystem that transfers data between, for example, computer components within data-processing system 400 or to and from other data-processing devices, components, computers, etc. The data-processing system 400 may be implemented in some embodiments as, for example, a server in a client-server based network (e.g., the Internet) or in the context of a client and a server (i.e., where aspects are practiced on the client and the server).

In some example embodiments, data-processing system 400 may be, for example, a standalone desktop computer, a laptop computer, a Smartphone, a pad computing device, a networked computer server, and so on, wherein each such device can be operably connected to and/or in communication with a client-server based network or other types of networks (e.g., cellular networks, Wi-Fi, etc). The data-processing system 400 can communicate with other devices or systems such as a printer 312 that can include or can be associated with an optical imager system 310. Note that the printer 312 can in some embodiments constitute a digital offset or digital architecture printing system, which may be used for printing with lithographic inks, and which implements digital offset printing processes.

Communication between the data-processing system 400 and printer 310 and/or the optical imager system 310 may be bidirectional, as indicated by the double arrow 402. Such bidirectional communications may be facilitated by, for example, a computer network, including wireless bidirectional data communications networks.

FIG. 14 illustrates a computer software system 450 for directing the operation of the data-processing system 400 depicted in FIG. 13, in accordance with an embodiment. Software application 454, stored for example in the memory 342 can generally include one or more modules such as the module 452 depicted in FIG. 14. The computer software system 450 also can include a kernel or operating system 451 and a shell or interface 453. One or more application programs, such as software application 454, may be "loaded" (e.g., transferred from, for example, mass storage or another memory location into the memory 342) for execution by the data-processing system 400.

The example data-processing system 400 depicted in FIG. 14 can receive user commands and data through the interface 453; these inputs may then be acted upon by the data-processing system 400 in accordance with instructions from operating system 451 and/or software application 454. The interface 453 in some embodiments can serve to display results, whereupon a user 455 may supply additional inputs or can terminate a session. The software application 454 can include module(s) 452, which can, for example, implement steps, instructions or operations such as those described herein. Examples of such steps, instructions or operations are depicted in block 212, block 214, block 216, and block 218 shown in FIG. 10. Module 452 may also comprise a group of modules and/or sub-modules.

The following discussion is intended to provide a brief, general description of suitable computing environments in which the system and method may be implemented. Although not required, the disclosed embodiments can be described in the general context of computer-executable instructions, such as program modules, being executed by a single computer. In most instances, a "module" can constitute a software application, but can also be implemented as both software and hardware (i.e., a combination of software and hardware). In still other embodiments, a module may be implemented as hardware, such as the various image modules discussed herein.

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may also relate to a collection of routines and data structures that can perform a particular task or can implement a particular data type. A module may be composed of two parts: an interface, which can list the constants, data types, variable, and routines that can be accessed by other modules or routines, and an implementation, which may be private (e.g., accessible only to that module), and which can include source code that actually implements the routines in the module. The term module can also refer to an application, such as a computer program that can be designed to assist in the performance of a specific task, such as, for example, word processing, accounting, inventory management, etc. A module may also refer to a physical hardware component or a combination of hardware and software.

The module 452 may include instructions (e.g., steps or operations) for performing operations such as those discussed herein. For example, module 452 may include instructions for operating the disclosed optical imager system. Examples of such steps, operations or instructions that module 452 may perform can include, for example, generating a beam of light by a laser light source included as a part of at least one imager module that comprises the laser light source, a collimator, an illumination optical system, a grating light valve, a spatial light modulator and a projection optical system; producing an image from in-line stitching of individual images generated by the at least one imager module among a plurality of imager modules operable in a stacked arrangement to produce the image from the in-line stitching of individual images generated by the at least one imager module; and homogenizing, shaping and directing a beam of light by the illumination optical system from the laser light source onto the grating light valve, wherein the homogenizing occurs in a cross-process direction.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. An optical imager system, comprising:
at least one imager module comprising a laser light source, a collimator, an illumination optical system, a grating light valve, a spatial light modulator and a projection optical system; and
a plurality of imager modules that includes the at least one imager module, wherein the plurality of imager modules is operable in a stacked arrangement to produce an image from in-line stitching of individual images generated by the at least one imager module among the plurality of imager modules, wherein the illumination optical system homogenizes, shapes, and directs a beam from the laser light source onto the grating light valve, and wherein homogenization occurs in a cross-process direction, wherein the at least one imager module is organized mechanically into a feathered section and an in-line section, wherein the feathered section and the in-line section are sized and arranged in a configuration of at least one upper level and at least one lower level to facilitate stacking of the stacked arrangement in a manner that avoids mechanical interference between imager modules among the plurality of imager modules.

2. The optical imager system of claim 1 wherein the image produced from the in-line stitching of the individual images comprises a seamless longer single pixelated line image from the in-line stitching of smaller individual pixelated line images produced by the at least one imager module.

3. The optical imager system of claim 1, wherein in the cross-process direction, the beam is shaped in a top-hat irradiance profile or a near top-hat irradiance profile.

4. The optical imager system of claim 1, wherein in a process direction, the beam comprises a Gaussian irradiance profile.

5. The optical imager system of claim 1, wherein at the grating light valve, an illumination is telecentric or near telecentric in a cross-process direction.

6. The optical imager of claim 1 wherein:
the collimator comprises at least one of: a fast-axis collimator lens or an aspherical collimator lens; and
the laser light source comprises at least one of: a laser diode array, a fiber-coupled laser, a fiber laser, a diode-pumped solid-state laser or a diode laser.

7. The optical imager system of claim 1 wherein the collimator comprises at least one of: a fast-axis collimator lens, or an aspherical collimator lens.

8. The optical imager system of claim 1 wherein the laser light source comprises at least one of:
a laser diode array;
a fiber-coupled laser;
a fiber laser;

a diode-pumped solid-state laser; and a diode laser.

9. An optical imager system, comprising:
at least one processor and a memory, the memory storing instructions to cause the at least one processor to perform:
generating a beam of light by a laser light source included as a part of at least one imager module that comprises the laser light source, a collimator, an illumination optical system, a grating light valve, a spatial light modulator and a projection optical system;
producing an image from in-line stitching of individual images generated by the at least one imager module among a plurality of imager modules operable in a stacked arrangement to produce the image from the in-line stitching of individual images generated by the at least one imager module; and
homogenizing, shaping and directing a beam of light by the illumination optical system from the laser light source onto the grating light valve, wherein the homogenizing occurs in a cross-process direction wherein the at least one imager module is organized mechanically into a feathered section and an in-line section, wherein the feathered section and the in-line section are sized and arranged in a configuration of at least one upper level and at least one lower level to facilitate stacking of the stacked arrangement in a manner that avoids mechanical interference between imager modules among the plurality of imager modules.

10. The optical imager system of claim 9 wherein the image produced from the in-line stitching of the individual images comprises a seamless longer single pixelated line image from the in-line stitching of smaller individual pixelated line images produced by the at least one imager module.

11. The optical imager system of claim 9 wherein:
the collimator comprises at least one of: a fast-axis collimator lens or an aspherical collimator lens; and
the laser light source comprises at least one of: a laser diode array, a fiber-coupled laser, a fiber laser, a diode-pumped solid-state laser or a diode laser.

12. The optical imager system of claim 9 wherein in the cross-process direction, the beam is shaped in a top-hat irradiance profile or a near top-hat irradiance profile.

13. The optical imager system of claim 9 wherein in a process direction, the beam comprises a Gaussian irradiance profile and wherein at the grating light valve, an illumination is telecentric or near telecentric in a cross-process direction.

14. A method of operating an optical imager system, comprising:
generating a beam of light by a laser light source included as a part of at least one imager module that comprises the laser light source, a collimator, an illumination optical system, a grating light valve, a spatial light modulator and a projection optical system;
producing an image from in-line stitching of individual images generated by the at least one imager module among a plurality of imager modules operable in a stacked arrangement to produce the image from the in-line stitching of individual images generated by the at least one imager module; and
homogenizing, shaping and directing a beam of light by the illumination optical system from the laser light source onto the grating light valve, wherein the homogenizing occurs in a cross-process direction, wherein the at least one imager module is organized mechanically into a feathered section and an in-line section, wherein the feathered section and the in-line section are sized and arranged in a configuration of at least one upper level and at least one lower level to facilitate stacking of the stacked arrangement in a manner that avoids mechanical interference between imager modules among the plurality of imager modules.

15. The method of claim 14 wherein the image produced from the in-line stitching of the individual images comprises a seamless longer single pixelated line image from the in-line stitching of smaller individual pixelated line images produced by the at least one imager module.

16. The method of claim 14 wherein in the cross-process direction, the beam is shaped in a top-hat irradiance profile or a near top-hat irradiance profile.

17. The method of claim 14 wherein in a process direction, the beam comprises a Gaussian irradiance profile.

18. The method of claim 14 wherein at the grating light valve, an illumination is telecentric or near telecentric in a cross-process direction.

19. The method of claim 14 wherein the collimator comprises at least one of: a fast-axis collimator lens, or an aspherical collimator lens.

20. The method of claim 14 wherein:
the collimator comprises at least one of: a fast-axis collimator lens; or an aspherical collimator lens; and
the laser light source comprises at least one of: a laser diode array; a fiber laser; a fiber-coupled laser; a diode-pumped solid-state laser; or a diode laser.

* * * * *